United States Patent [19]

Tsuda et al.

[11] 4,298,276
[45] Nov. 3, 1981

[54] CASSETTE TYPE ROLL SHEET FEEDING APPARATUS

[75] Inventors: Hiroshi Tsuda, Mitaka; Kiyoshi Miyashita, Hachioji; Katsuhiko Kimura, Hachioji; Heihachi Arima, Hachioji; Osamu Ishimoto, Hachioji, all of Japan

[73] Assignee: Olympus Optical Company Limited, Tokyo, Japan

[21] Appl. No.: 102,823

[22] Filed: Dec. 10, 1979

Related U.S. Application Data

[62] Division of Ser. No. 918,822, Jun. 22, 1978, Pat. No. 4,218,135.

[30] Foreign Application Priority Data

Jun. 24, 1977 [JP]  Japan .................................. 52-74967
Jun. 24, 1977 [JP]  Japan .................................. 52-74968

[51] Int. Cl.³ ........................................... G03B 27/58
[52] U.S. Cl. ........................................ 355/72; 226/90; 242/198
[58] Field of Search .......................... 226/90; 242/198; 355/72

[56] References Cited

U.S. PATENT DOCUMENTS 3,722,999  3/1973  Cunha et al. ..................... 355/72 X

*Primary Examiner*—Richard A. Wintercorn
*Attorney, Agent, or Firm*—Haseltine and Lake

[57] ABSTRACT

A cassette roll sheet feeding apparatus for feeding a roll sheet from a cassette after the roll sheet cassette is loaded in a copying machine employs a sheet guide. The sheet guide is near a sheet outlet having at least one opening. An assembly such as a roller rotatably journaled by a shaft, serves to assist the feeding of the roll sheet through the outlet and is urged against the sheet guide through the leading end of the roll sheet.

A sheet feed roller is in the copying machine body and projects through the opening in the sheet guide to hold the sheet in cooperation with the roller, when the cassette is mounted in the copying machine body. The sheet is held at the leading end portion when the cassette is removed from the copying machine body.

3 Claims, 16 Drawing Figures

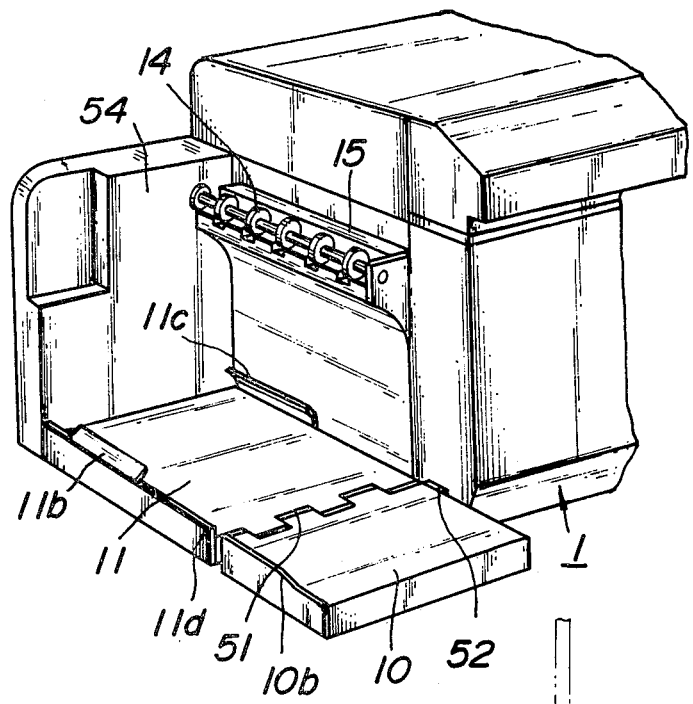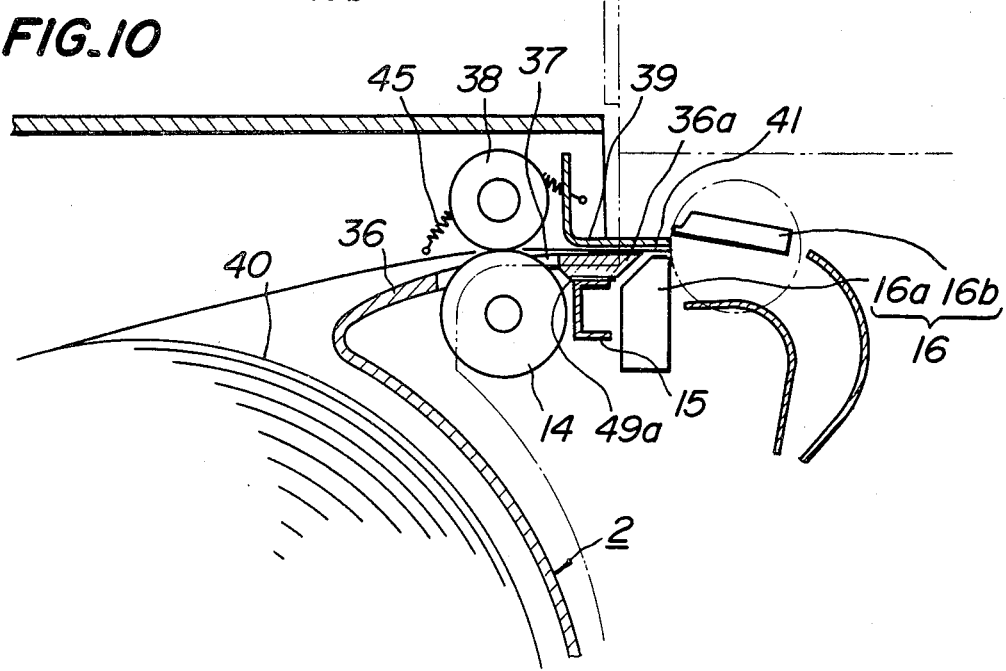

CASSETTE TYPE ROLL SHEET FEEDING APPARATUS

This is a division of application Ser. No. 918,822 filed June 22, 1978, now U.S. Pat. No. 4,218,135, issued Aug. 19, 1980.

BACKGROUND OF THE INVENTION

This invention relates to a roll sheet cassette feeding apparatus for use in a copying or reproducing machine, in which a cassette containing therein a record sheet in the roll form is employed.

In a prior art copying machine using a roll sheet, the procedure of loading a roll sheet in the copying machine and of exchange of one type roll sheet to another have been very complicated as follows; a rotary shaft is first inserted in a desired roll sheet; then the roll sheet and the rotary shaft is set in the copying machine, with the leading edge of the sheet being guided through complicated passages in the machine body so that the edge of the sheet is brought into the bite of the sheet feed rollers; and the sheet feed rollers are rotated by a given amount to feed the roll sheet to a given position. Such procedures, however, have been time consuming. Furthermore, during these procedures, fingerprints or stains of an operator would be left on the surface of the roll sheet, and the operator is required to handle these procedures carefully so as not to fold or damage the end portion of the sheet during these procedures.

A roll sheet which is taken out from the copying machine body, for exchange of sheet size between an A-size sheet and a B-size sheet is liable to be stained on the surface thereof, as well as broken or folded in the end portion thereof.

The strains on the sheet surface or the undesired charge on the sheet would be undesirably developed into a visible image in an overlapped relation to a desired developed image of an original, particularly in the case where a sheet of zinc oxide or an electrostatic record sheet is used. The fold or break in the end portion of the sheet is responsible for the jamming of the sheet during the transportation thereof within the copying machine body.

In order to solve the above-described drawbacks, a variety of roll cassette type copying machines have been proposed, in which an A-size roll sheet and a B-size roll sheet are set in different cassettes, respectively, so that the cassette itself may be replaced by another at the time of exchange of one size sheet for another.

These prior art apparatuses, however, include a variety of problems, particularly from the practical viewpoint of the copying machine.

Regarding the positioning of the leading edge of the record sheet in the roll form usually at a constant position, various attempts have hitherto been proposed: one is such as shifting the leading edge of the sheet to a position of a cutter by utilizing the shifting stroke of a cassette loading mechanism in association with the operation of mounting the roll sheet cassette in the copying machine body; and the other is such as locating the leading edge of the sheet at a proper position by separating one sheet feed roller on the copying machine side from another while the leading edge of the sheet is left as it is. In the former, the construction of the apparatus is complicated and precision in machining of mechanical portions is highly required in order to locate the leading edge of the sheet properly at a constant position. Furthermore, in order to mount the cassette in the copying machine body, an operator must pay a close attention to the condition of engagement between the cassette and a sheet feeding member in the copying machine body in the event of loading the cassette. This requires an experienced skill and hence partly impairs the advantages inherent in a cassette system. In the latter, the leading edge portion of the sheet is exposed over a comparatively long area from the cassette and remains unsupported. Such a long leading edge portion of the sheet must be inserted between the sheet feed rollers in the copying machine body, while the leading edge portion is maintained in a horizontal direction. In order to load or mount the cassette in the copying machine under such a condition, an operator is required to handle the cassette carefully, so that the leading edge of the sheet is fitted in a small gap between the feed rollers and that the leading edge portion thereof is not folded or broken. Thus, this latter case also failed to make the best use of the advantages of the cassette system.

Further, in more detail, problems arise in the event of replacement of one roll sheet cassette with another are how to locate the leading edge of sheet at a constant point precisely and how to protect the leading end portion thereof. Under a condition that a cassette is mounted and served for use in the copying machine body, the sheet extends from a sheet exit opening in the cassette, via a first sheet feed roller and locates its leading edge at a position of the cutter. In the case that the cassette is demounted from the copying machine body, and that thereafter the cassette is set again in the copying machine body for the following copying service, the leading edge of the sheet must be positioned always at the same position precisely in order to cut the roll sheet by a given length accurately even from the first copying operation. This is met by employing a method, in which a roller for drawing or putting the leading end of sheet out of or into a cassette is provided in the cassette, in a manner that the roller is rotated by utilizing the shifting stroke of the cassette with respect to the copying machine body when mounted or removed therein or therefrom, and when the cassette is removed from the copying machine body, the leading end of the sheet is submerged in the cassette so as to be protected from external force, and when the cassette is mounted in the copying machine body, the leading end of sheet is fed to the home position of the cutter. With this method, however, it is necessary to provide a mechanism by which the upper and lower sheet feed rollers provided in the copying machine body is spaced from each other simultaneously at the time of insertion or removal of the cassette in or from the copying machine body and these sheet feed rollers rotate simultaneously at the time of feeding the sheet. This results in the complexity in construction as a whole, the need for a high precision in machining of respective portions in order to realize reliable operations, leading to a costly device. To cope with this, another attempt has been proposed, in which a cassette is mounted in or removed from the copying machine body only by separating one sheet feed roller from the other on the machine body side, while the leading end of sheet remains intact. With this method, the leading end of sheet is left as it projects long from the cassette when removed from the copying machine body and is likely to be subject to a damage such as being folded or broken. In the case of mounting the cassette in the copying machine body, a close attention is required for inserting the leading end of the sheet in a small gap between the feed rollers in the copying machine body. Since the cassette itself does not include any means, such as a roller, for supporting the leading end of the sheet, it is possible that due to shock or vibration upon handling of the cassette, the roll sheet is unwantedly rotated to submerge the leading end in the cassette, and therefore it is difficult to restore the leading end of the sheet to the home position.

It is the main object of the present invention to provide a cassette type roll sheet feeding apparatus in conjunction with a roll sheet cassette loading apparatus which can remove the above described drawbacks and has simple construction and reliable operation.

To attain the above described objects, provided according to the present invention. There is provided a roll sheet cassette loading apparatus for removably mounting a cassette containing a roll sheet in a copying machine body, said roll sheet cassette loading apparatus comprising means for drawing out said cassette from an operation side of said copying machine body toward an operator side and means for forcing back said cassette from said operation side toward said copying machine body.

A cassette type roll sheet feeding apparatus according to the present invention comprises a record sheet guide having a cut or an opening and provided in said roll sheet cassette, a member for assisting the feeding of said record sheet, said member being provided in said cassette and brought into pressure contact with said record sheet guide through the mediary of the leading end portion of said record sheet in the roll form, and a sheet feed roller provided in said copying machine body, and adapted to project through said opening or cut in said record sheet guide, to thereby hold said record sheet in the roll form in cooperation with said member for assisting the feeding of said record sheet, when said cassette is mounted in said copying machine body, thereby putting said record sheet into said condition, whereby said record sheet in the roll form being held at the leading end portion thereof between said member for assisting the feeding of said record sheet and said record sheet guide, when said cassette is removed from said copying machine body.

BRIEF DESCRIPTION OF THE DRAWINGS

FIGS. 8 and 9 are perspective views of a portion for mounting the roll sheet cassette prior to and after the removal of the roll sheet cassette from the machine body, respectively;

FIGS. 10 and 11 diagrammatically show the engagement and disengagement of a beak portion of the roll sheet cassette with the copying machine body, respectively, under the conditions of the roll sheet cassette shown in FIGS. 2 and 5;

DESCRIPTION OF PREFERRED EMBODIMENTS

Figure 1:
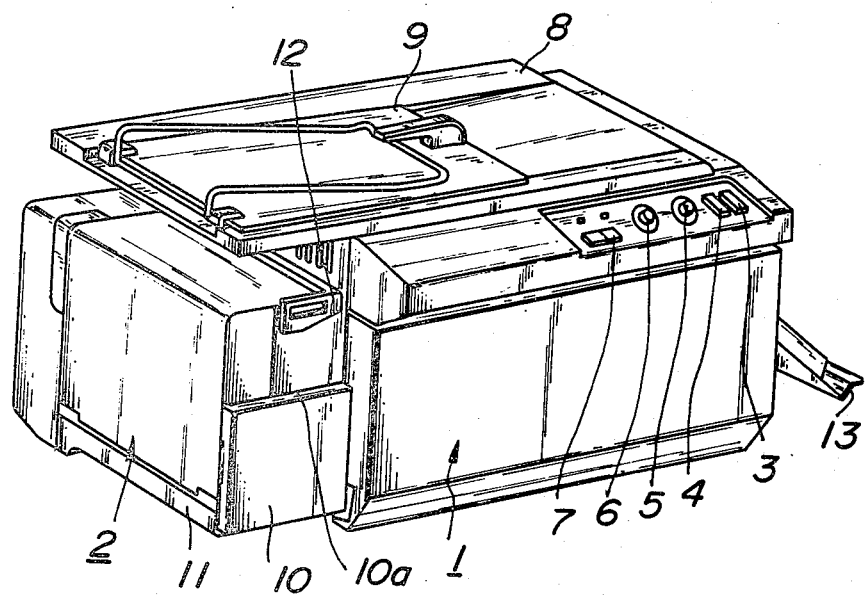
FIG. 1 is a perspective view of an external appearance of a copying machine in which a roll sheet cassette is mounted.

FIG. 1 is a perspective view of an external appearance of a copying machine in which a roll sheet cassette according to one embodiment of the invention is mounted. Reference numeral 1 denotes a copying machine body, and reference numeral 2 denotes a roll sheet cassette according to the invention. Copying machine body 1 includes a power source switch 3, a copy button 4, a copy number setting dial 5, a contrast dial 6, and a copy size setting button 7. Shown at a reference numeral 8 is an original support, at 9 an original holder, at 10 an operation panel for mounting and demounting cassette 2. The operation panel 10 has a grip 10a, and reference numeral 11 denotes a cassette support or rest. Designated 12 is a handle of cassette 2, which is pivotally movable, although the handle is brought into a housed condition when the cassette 2 is mounted in the machine body 1, as shown in FIG. 1. Further, reference numeral 13 denotes a copy tray.

Figure 2:
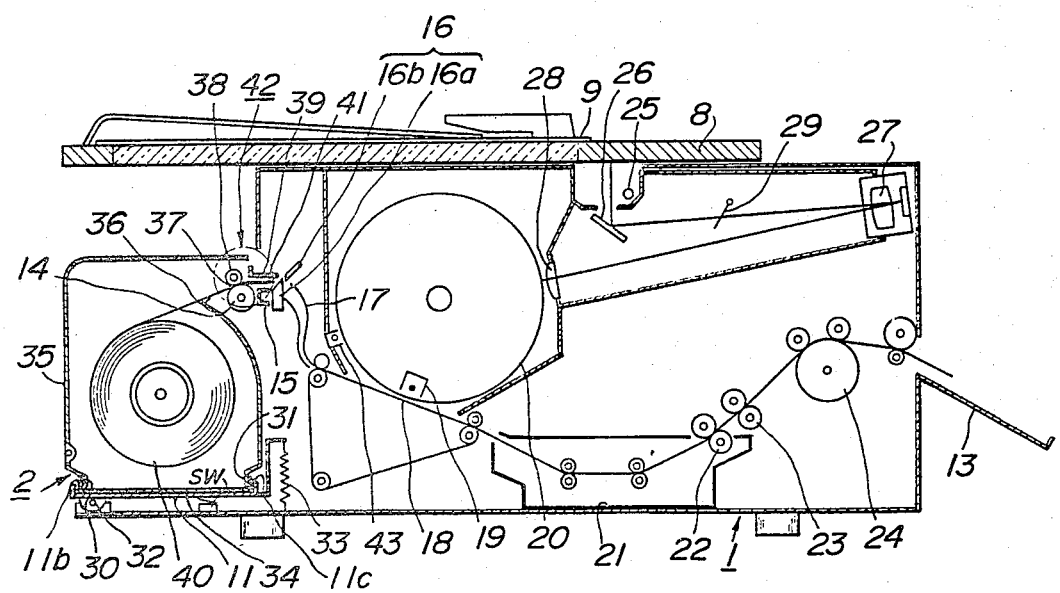
FIG. 2 is a schematic elevation of the copying machine, for illustration of the interior of the copying machine.

FIG. 2 is a schematic elevation for illustrating the internal structure of copying machine body 1 and roll sheet cassette 2 by way of example. Shown at 14 is a sheet feed roller rotatably supported by a shaft on copying machine body 1 and for driving the sheet to be fed, at 15 an electrically conductive fixed piece rigidly secured to the machine body 1, and at 16 a cutter consisting of a stationary blade 16a and a rotary blade 16b. Shown at 17 is a sheet guide, and at 18 a record sheet transporting belt, by which the record sheet is transported, while the record sheet is electrostatically attracted to the belt 18. Designated 19 is a corona charger which effects a uniform charging prior to the formation of a primary latent image and applies the charge to the record sheet at the transfer of the latent image onto the record sheet, and the polarity of which may be changed over from one to another, as the case may be. Shown at 20 is a photosensitive drum in the screen form having a number of fine perforations. Shown at 21 a developing unit, at 22 a pair of squeezing rollers, at 23 a pair of soaking rollers, and at 24 a drying and fixing drum, those of which define a record sheet transporting path, while achieving their own functions. Shown at 25 is an original irradiating lamp, at 26 a reflector, and at 27 and 28 are focusing lens for projecting an image of an original onto the surface of photosensitive drum 20. Designated 29 is a diaphragm interlocking with contrast setting dial 6.

Cassette rest 11 retains thereon cassette 2 by maintaining engaging portions 11b and 11c in engagement with engaging grooves 30 and 31, respectively. Cassette rest 11 is loosely supported at one end thereof by a stationary shaft 32, which in turn is attached to copying machine body 1, and always biased at the other end downwards by the force of a spring 33.

Shown at 34 is a casing of cassette 2, at 35 a cover, at 36 a sheet guide, at 37 a window through which is seen feed roller 14, at 38 a pinch roller, and at 39 an upper sheet guide. A record sheet 40 in the roll form has a leading end 41 coincident with a cutting line of cutter 16. Shown generally at 42 is an aperture of cassette, through which the leading end of record sheet 40 in the roll form is to be drawn out, and which consists of a sheet guide 36 and an upper sheet guide 39. This aperture is called a beak portion of cassette 2 in this specification. Designated 43 is a charge-erasing lamp, and designated SW is a switch for making the breaking a power source circuit for driving sheet feed roller 14.

Figure 3:
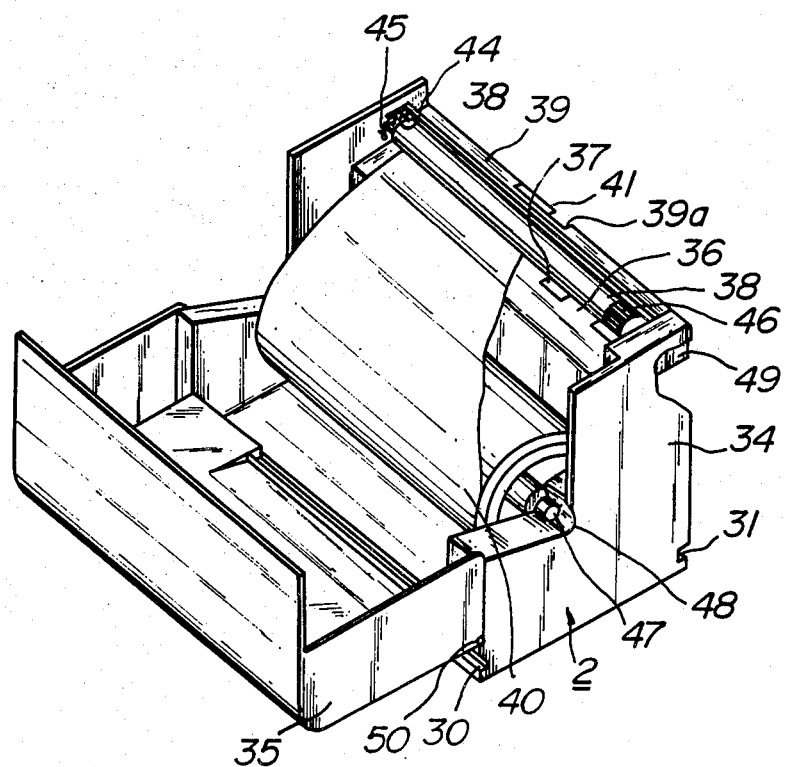
FIG. 3 is a perspective view of the roll sheet cassette shown in FIGS. 1 and 2, wherein a cover of the cassette is turned to an open position.

FIG. 3 is a perspective view of cassette 2, shown with cover 35 turned to an open position. Provided in the vicinity of the front upper edge portion of cassette casing 34 is a record sheet guide 36 having opening 37, adapted to receive therein sheet feed roller 14 which is provided in copying machine body 1. Upper sheet guide 39 is spaced a small distance from record sheet guide 36. Upper sheet guide 39 is made of electrically conductive material. Just above opening 37, pinch roller 38 is rotatably supported by a bearing metal 44, which in turn is rigidly secured to cassette casing 34. In this embodiment, pinch roller 38 is made of electrically conductive rubber ($10^4$ to $10^6$ $\Omega$cm), and pressed normally on sheet guide 36 under the action of a spring 45, which is secured to bearing metal 44 and cassette casing 45. Shown at 46 is a finger screw for driving the leading end of sheet 40 into a gap between upper and lower sheet guides, and at 39a a cut for the confirmation of a position of the leading end 41 of record sheet 40.

Record sheet 40 in the roll form is housed in the cassette by inserting spools 47 into the respective ends of the core of the roll of record sheet 40, placing the spools on spool supports 48 on the respective sides of the cassette casing, and paying out the leading end 41 of record sheet 40 along sheet guide 36 by means of finger screw 46 for paying out the lead end, which is provided on pinch roller 38.

Reference numeral 49 represents a grounding piece, which is attached to cassette casing 34 and so arranged as to be electrically connected to pinch roller 38 and upper sheet guide 39. Designated 50 is a shaft, about which cover 35 effects a pivotal movement between an open position and a close position.

Operations of the above described construction will be explained.

While the present invention is generally applied to a copying or reproducing machine or the like using a record sheet in the roll form, the following description will be focused mainly on the case of an electrophotographic copying machine using an electrostatic record sheet, for the convenience of the explanation. This particular case does not limit the scope of this invention.

When roll sheet cassette 2 containing therein record sheet 40 in the roll form as shown in FIGS. 1 and 2 is loaded in copying machine body 1, then record sheet 40 will be held under proper pressure between sheet feed roller 14 in copying machine body 1 and pinch roller 38 in cassette 2, and the leading end 41 of record sheet 40 will ride on stationary blade 16a of cutter 16 to coincide with a cutting line of rotary blade 16b. Thus, everything becomes ready for starting the copying operation. At this time, contacting portion 49a of grounding piece 49 is in contact with fixed piece 15 attached to the machine body 1.

Then, power source switch 3 is thrown to the ON position; an original is placed on original support 8; original holder 9 is turned to a close position; copy number setting dial 5 is set at a desired number; contrast setting dial 6 is set at a value commensurate to a density of original; and copy size setting button 7 is set at a desired paper size. Thus, preparations for the copying operation are all completed. When print button 4 is pressed, then original support 8 will start moving to the rightward direction as viewed in FIG. 1 or 2. Photosensitive drum 20 about which a photosensitive screen is trained is rotated in synchronism with the movement of original support 8, while being charged with electricity by means of corona charger 19, whereby a primary electrostatic latent image is formed on the outer peripheral surface of photosensitive drum 20 by exposure and focusing means 25, 26, 27 and 28, and thereafter original support 8 will be returned to the leftward direction as viewed in FIG. 1 or 2. Photosensitive drum 20 will then start rotating on the second cycle. By a signal produced in due time from photosensitive drum 20, a driving force will be transmitted to sheet feed roller 14 in reproducing machine body 1, whereby the roller will start rotating. Since record sheet 40 is held under proper pressure between sheet feed roller 14 and pinch roller 38 in cassette 2 as described above, rotation of sheet feed roller 14 causes record sheet 40 to travel. When a driving force for sheet feed roller 14 is interrupted in response to a signal produced by copy size setting button 7 and photosensitive drum 20, then cutter 16 will be operated to cut record sheet 40 at a position of a given length commensurate to a set copy size. The travel of record sheet 40 contained in cassette 2 is then stopped. The cut record sheet will be transported by transporting belt 18 to a position just below corona charger 19, at which the primary electrostatic latent image on photosensitive drum 20 will be transferred as a secondary electrostatic latent image onto the record sheet 40. The cut record sheet will then be transported by way of developing unit 21, squeezing rollers 22, soaking rollers 23 and drying and fixing drum 24, and eventually delivered as a copy have a visible image thereon to copy tray 13.

Charge erasing lamp 42 serves to expose the primary electrostatic latent image formed in the previous cycle of copying operation so as to erase the primary electrostatic latent image uniformly, prior to a subsequent scanning of the original. Diaphragm 29 is arranged as to interlock with contrast dial 6 so as to adjust an amount of exposure light.

When it is desired to change a copy size, for example, from an A-size copy to a B-size copy, pursuant to the size of an original, it is necessary to remove cassette 2 containing therein A-size record sheet 40 from copying machine body 1 and to mount cassette having a B-size record sheet in the copying machine body. Procedures for exchanging one cassette for another will be explained in the following.

Figure 4:
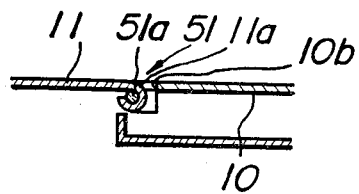
FIG. 4 is a cross sectional view showing the condition of an engagement between a cassette support and an operation panel for mounting and demounting the cassette in and from the copying machine, both of which are provided in the copying machine shown in FIGS. 1 and 2.
Figure 5:
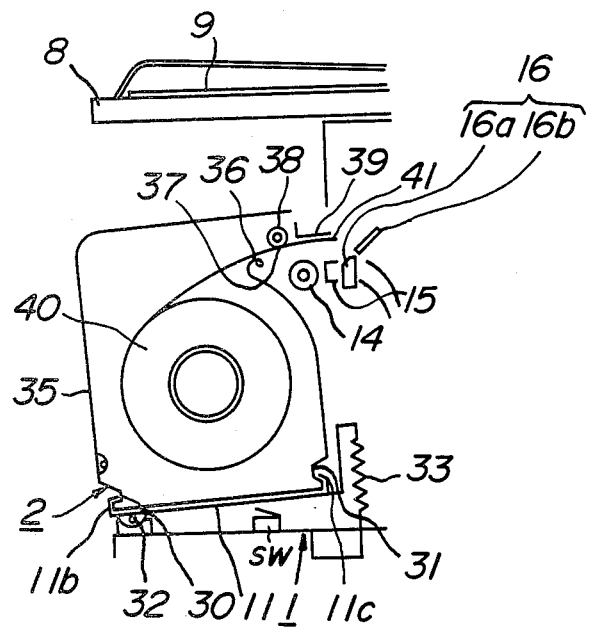
FIG. 5 is a fragmentary schematic view showing the condition of the rotation of the roll sheet cassette incorporated in the copying machine shown in FIG. 1.
Figure 6:
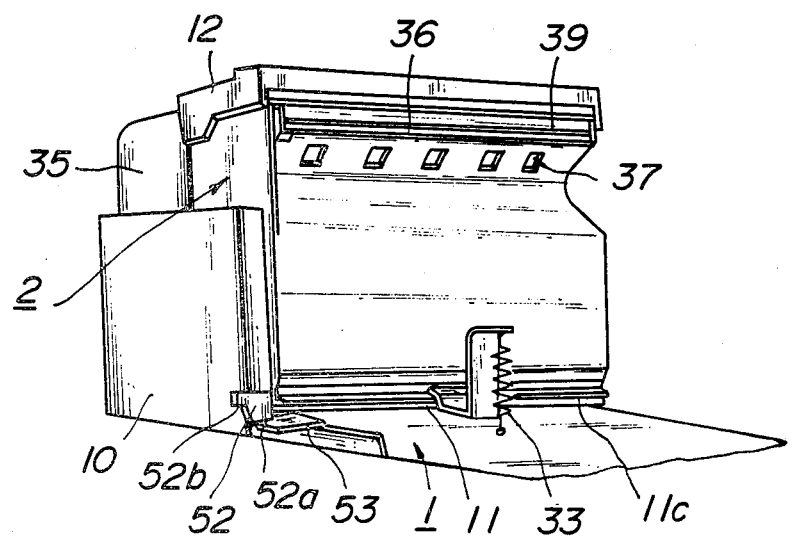
FIGS. 6 and 7 are perspective views of the roll sheet cassette respectively, for illustration of the posture of the cassette before and after the operations of the operation panel.
Figure 7:
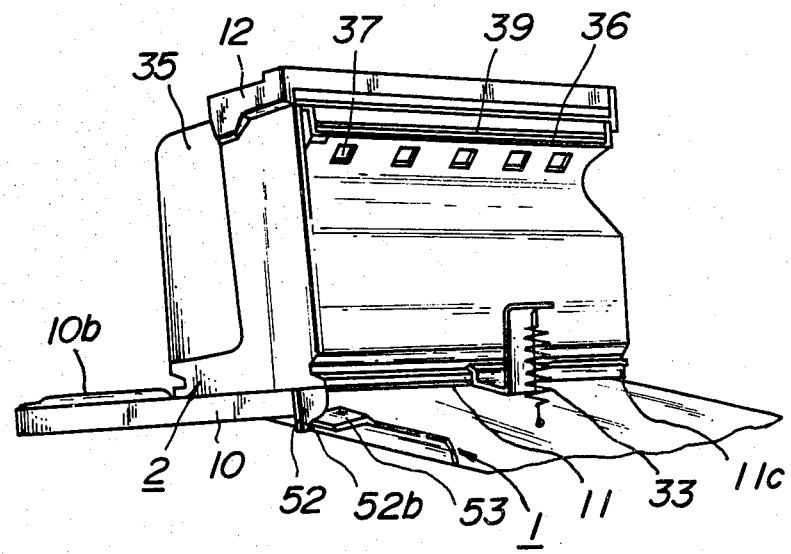
Figure 8:
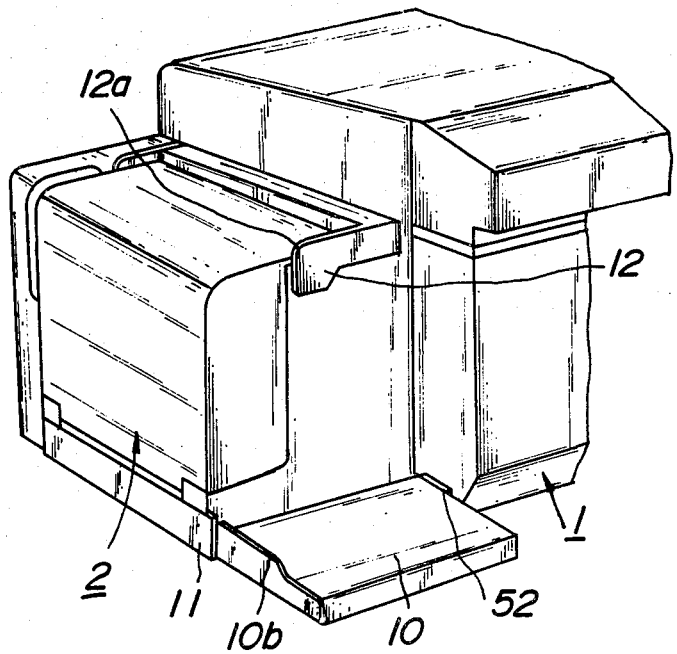

When operation panel 10 of copying machine body 1 is turned frontward as viewed in FIG. 1 by holding grip 10a by an operator, then a hinge 51 constituted by front edge portion 11a of cassette rest 11 and lower end portion 10b of operation panel 10 as best seen in FIG. 4, is turned about a shaft 51a to a front open position. At this time, as is seen in FIGS. 5 through 7, a cam face 52a of a cam 52 formed integrally with the lower right end portion of operation panel 10 will slide on a cam support 53 in copying machine body 1 to lift cam 52, whereas cassette rest 11 is turned upwards about stationary shaft 32 attached to the machine body against the force of cassette fixing spring 33, whereby the cassette support is lifted at the right side portion thereof. With the progress of the sliding rotation of cam 52, a stopper 52b will be brought into engagement with the front edge of cam rest 53, and cassette support 11 and operation panel 10 will assume a second position, in which both members are lifted at the right side portions thereof in a tilted fashion and operation panel 10 takes a developed posture to make flush with the plane of cassette support 11, as seen in FIGS. 8 and 9. At this time, switch SW for making and breaking a sheet feeding power source is rendered to the open position, such that there is no likelihood of sheet feed roller 14 being unexpectedly rotated.

By virtue of the engagement of cassette holders 11b and 11c of cassette rest 11 with engaging grooves 30 and 31 in cassette 2, cassette 2 and cassette rest 11 are lifted together by the above described operation as shown in FIG. 9, and sheet guide 36 and pinch roller 38 in cassette 2 will be separated from sheet feed roller 14 in copying machine body 1.

Figure 11:
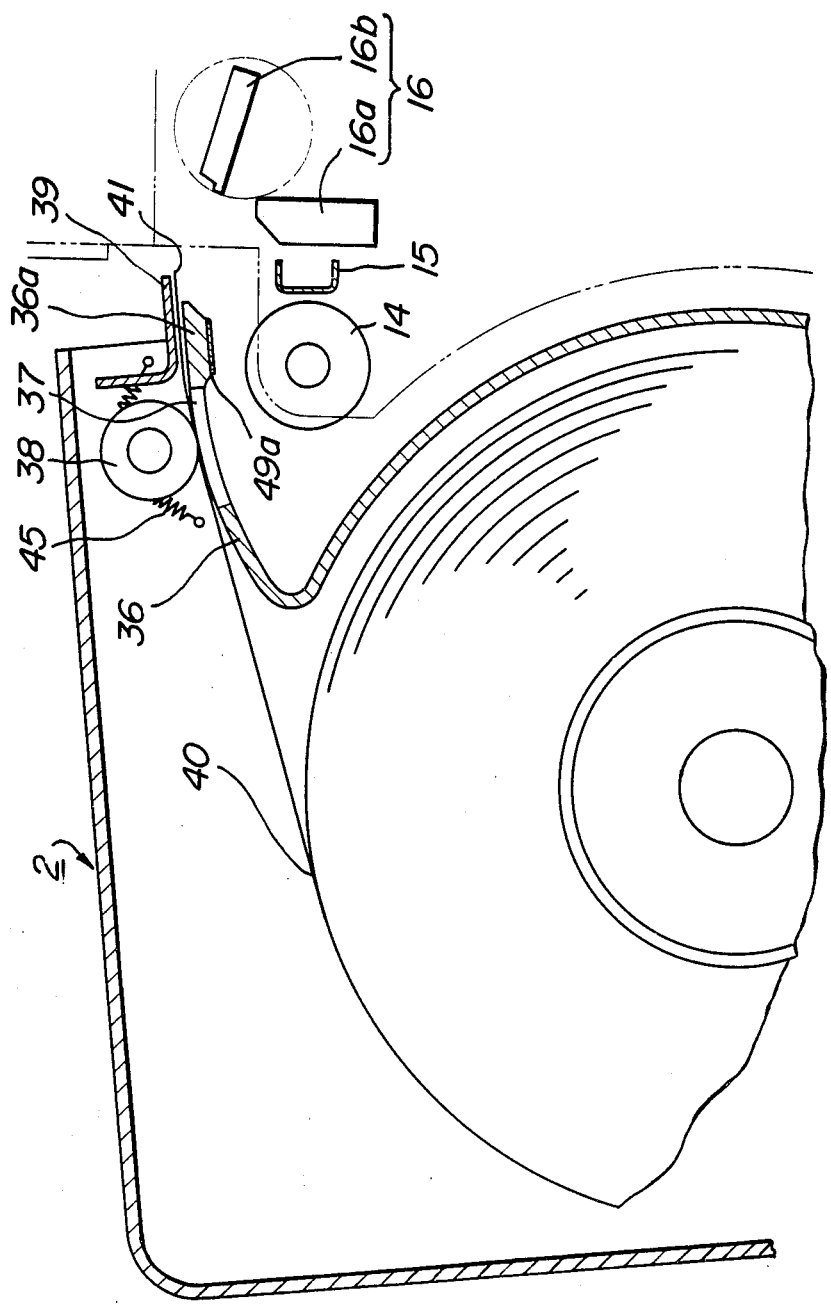

Operations of sheet guide 36, pinch roller 38 and record sheet 40 on the side of cassette 2 and sheet feed roller 14 in copying machine body 1 will be referred to in conjunction with FIGS. 10 and 11. When cassette 2 begins to be lifted at the front edge portion thereof by the above-described operation, a level setting abutting face 36a provided on the front reverse surface of sheet guide 36 in cassette 2 will be separated from fixed piece 15 in copying machine body 1, and pinch roller 38 will then be separated from sheet feed roller 14. By the biasing action of spring 45 that usually urges pinch roller 38 on sheet guide 36, record sheet 40 will be held fast between sheet guide 36 and pinch roller 38 at this instant. Since record sheet 40 in cassette 2 is stopped, with its leading end 41 coincident with the cutting position of the cutter upon termination of one cycle of copying operations, then record sheet will be held at that position by sheet guide 36 and pinch roller 38. Since the length of pinch roller 38 is larger than the maximum width of record sheet 40 to be accommodated in the cassette as shown in FIG. 3, the pinch roller 38 is pressed at the opposite end portions thereof directly by sheet guide 36, so that the braking action is provided, for the assurance of retention of record sheet 40 therebetween. With the progress of the upward movement of the beak portion 42 of cassette 2, opening 37 in sheet guide 36 in cassette 2 becomes away from sheet feed roller 14 in copying machine body 1, and the beak portion 42 of the cassette will eventually pass beyond sheet feed roller 14 fixed piece 15 and stationary blade 16a of cutter 16 on the copying machine body side to assume a position above these members. The beak portion of the cassette is thus completely separated from the copying machine body. At this time, contacting portion 49a of grounding piece 49 will be separated from fixed piece 15.

With the cassette 2 maintained in the above-described posture, the cassette 2 will be pulled to the front, as viewed in an operator, for removal of the cassette from the reproducing machine. This operation will be more in detail referred to in conjunction with FIGS. 8 and 9. In FIG. 8, beak portion 42 of cassette 2 is positioned beyond and above the connecting portion of sheet feed roller 14 in the copying machine body 1 with cassette 2 as described above. At that position, the beak portion 42 of cassette 2 does not suffer any interference by the copying machine body 1, so that when an operator pulls the cassette toward him by holding the front projection 12a of grip 12 in cassette 2, the cassette will slide on the plane formed by cassette support 11 and operation panel 10 to a position in which the front edge of cassette 2 coincides with the front edge of operation panel 10. At this instant, since cassette holders 11b and 11c are released from engagement with engaging grooves 30 and 31 in cassette 2, if an operator raises handle 12 upright, and lifts the cassette angularly upward by gripping the handle, then cassette 2 will be removed from the cassette support 11, thus providing the condition shown in FIG. 9. In this connection, only a small clearance need be left between the free end of upper sheet guide 39 in cassette 2 and the rotary blade edge of cutter 16 for ease of mounting and demounting of the cassette in and from the copying machine body 1. For this reason, the cassette 2 may be removed from the copying machine body 1, with the leading end of record sheet 40 projecting by a small extent from the free end of upper sheet guide. The length of sheet end projecting from the sheet guide is in the order of approximately 0.5 mm, which does not impair the practical use of the copying machine.

When it is desired to mount another cassette containing a record sheet of a different size in the copying machine body 1, such a cassette may be set in the copying machine body 1 by reversing the above-described procedures. As shown in FIG. 9, when a selected cassette 2 is placed on the plane formed by the combination of cassette support 11 and operation panel 10, and then forced back along upright guides 10and 11d, then engagement of the engaging portions of the cassette 2 with the cassette rest 11 will be accomplished to hold the cassette 2 thereby. By pushing the cassette 2 back to a further extent, the cassette 2 will impinge on the rear wall surface 54 and be held properly at that position. When operation panel 10 is then pulled upright, then cassette rest 11 and cassette 2 are pivotally moved at the right side portion downward by the biasing force of spring 33 to resume the postures as shown in FIGS. 1 and 2. The setting of another cassette in the reproducing machine is thus completed. How to locate record sheet 40 usually at a constant position upon setting a cassette in the copying machine body 1 and the relationship between pinch roller 38 and sheet feed roller 14 at that time are of particularly important matter and will be described in more detail with reference to FIGS. 10 and 11.

Figure 12:
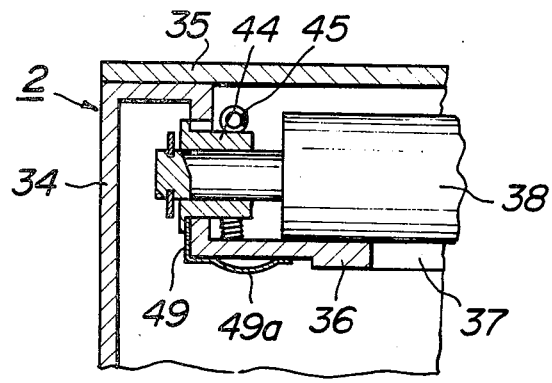
FIG. 12 is a sectional view showing a portion to which a grounding piece of the cassette shown in FIG. 3 is attached.

When the above-described loading operation is started, beak portion 42 of cassette 2 will move downward from the position shown in FIG. 11, and sheet feed roller 14 in copying machine body 1 will get access to opening 37 in sheet guide 36 of cassette 2, so that sheet feed roller 14 will be brought into contact with record sheet 40 through opening 37, and eventually into contact, through the intermediary of record sheet 40, with pinch roller 38. Although pinch roller 38 is pressed downward under the force of spring 45 to retain record sheet 40 as described above, since the biasing force of cassette fixing spring 33 in copying machine body 1 is so much stronger than that of spring 45, then cassette 2 will be moved downward to some extent while pinch roller 38 is being urged upward. When abutting face 36a on the front reverse surface of sheet guide 36 is brought into abutment with fixed piece 15 in copying machine body 1, the downward movement of the cassette 2 will be stopped. At this time, sheet feed roller 14 projects to some extent from the sheet guide surface of sheet guide 36 through opening 37 in the guide, and urges pinch roller 38 upward, so that record sheet 40 will be released from sheet guide 36, and in tern held under proper pressure between sheet feed roller 14 and pinch roller 38. Since record sheet 40 is held under proper pressure between sheet feed roller 14 and pinch roller 38 as soon as the sheet has been released from the sheet guide 36, the leading end 41 of record sheet 40 will resume the same position as the leading end of record sheet 40 in the former cassette 2 has been located. In other words, the leading end 41 of record sheet 40 will be located in coincidence with the cutting line of cutter 16, thus allowing the copying procedures. By this time, electrical connection of contacting portion 49a of grounding piece 49 in cassette 2 with the members for the transportation of the record sheet, such as pinch roller 38 and upper sheet guide 39, has been established, and contacting portion 49a of grounding piece 49 will be pressed against fixed piece 15 to supply a current thereto. Such, however, does not hinder locating cassette 2 at a proper position, because contacting portion 49a is of a resilient structure, as shown in FIG. 12.

As is apparent from the foregoing, simultaneously with the loading of cassette 2 in copying machine body 1, sheet feed roller 14 in copying machine body 1 and pinch roller 38 in cassette 2 cooperate to hold record sheet 40 therebetween, with its leading end 41 coincident with the cutting line of the cutter, to thereby cooperatively feed the record sheet 40, such that if a driving force is transmitted to sheet feed roller 14, then pinch roller 38 will be automatically rotated together with the sheet feed roller 14, to thereby feed record sheet 40, dispensing with any special means for locating the leading end of record sheet 40 at a constant position. Thus, directly after the loading of cassette 2 in the copying machine body 1, a copy is available, and a copy having a given length may be obtained from the first cycle of copying operation.

At the time of loading the cassette 2, the leading end 41 of record sheet 40 may be set at a given position while descending from above with respect to sheet feed roller 14, with the freedom of being folded or damaged, which would otherwise cause the jamming in the copying machine body 1 during the copying operation. In the process of demounting the cassette from the copying machine body 1 or during the storage of the cassette, record sheet 40 is immovably retained by pinch roller 38, with the leading end thereof maintained at a constant position, so that there is no likelihood of record sheet 40 being inadvertently paid into cassette 2, or the leading end of sheet being damaged during storage, since the leading end of record sheet 40 is maintained coincident with the front free end of upper sheet guide 39 in cassette 2. In place of pinch roller 38 in cassette 2, a sliding guide or belt may be utilized with the same results.

With the copying machine using an electrostatic record sheet, there occurs occasionally a charging phenomenon due to the surface friction of pinch roller 38 relative to upper sheet guide 39 in the process of transportation of record sheet 40, and the undesirable charge on such a record sheet is developed into a visible image in an overlapped relationship with a desired developed image, thus producing a copy of a lowered quality. According to the present invention, however, the record sheet transporting members within cassette 2 are grounded together with copying machine body 1, so that there is avoided such as undesirable charging phenomenon, with the assurance of production of a copy of improved quality. This is also the case in handling roll sheet 40 for exchange of one roll sheet for another. In such case, roll sheet 40 has been liable to be stained or damaged due to fingerprints of an operator or the like. In the embodiment shown, an operator need not touch record sheet 40 itself for exchange between an A-size sheet and a B-size sheet, with the minimum loss in copy sheet.

An electrostatic record sheet or the like is liable to be curled under a high moisture condition, thus leading to the jamming in the reproducing machine body during the copying operation. The leading end of record sheet 40, according to the present invention, is subjected to regulation by the upper and lower sheet guide members 36 and 39 and fixedly retained by pinch roller 38, so that an extent of sheet to be curled is reduced to the minimum. In order to prevent a roll sheet from being curled more perfectly handle 12 may be so arranged as to be depressed to an extent of covering beak portion 42 of cassette 2, and in addition this beak portion 42 can be sealingly closed by sealing material. This is desirable from the viewpoint of protecting the leading end of record sheet 40 completely.

In the embodiment shown, exchange of one record sheet 40 in the roll form for another may be achieved, with cassette 2 maintained in the copying machine body 1, or with the cassette 2 removed therefrom. In either case, cover 35 is turned to an open position; then spool 47 serving as a rotary shaft is fitted in each end of core of record sheet 40, and placed on spool rest 48 in cassette 2; and finger screw 46 of pinch roller 38 is turned, with the leading end portion of record sheet 40 positioned along with sheet guide 36. Then, the leading end of record sheet is guided to a given position by pinch roller 38 and sheet feed roller 14 where exchange of one record sheet for another is effected with the cassette 2 mounted in the machine body 1, and on the other hand the guidance of the record sheet 40 thereto is achieved by pinch roller 38 and sheet guide 36 where exchange or record sheet 40 is effected with the cassette 2 removed from the copying machine body 1. In such case, the position of the leading end 41 of the record sheet 40 may be checked up through cut 39a in upper sheet guide 39. If arrangements are made for covering the leading end 41 of record sheet 40 with handle 12, the leading end may impinge on the circumferential wall of cut 39a. As soon as such cassette 2 has been mounted in the copying machine body 1, the copying procedure is immediately permitted. In the event of a shift of the leading end of record sheet 40 from a regular position, there would be produced only a single copy short of or in excess of a given length, with the production of remaining copies of a regular length in the succeeding copying procedures.

Figure 13:
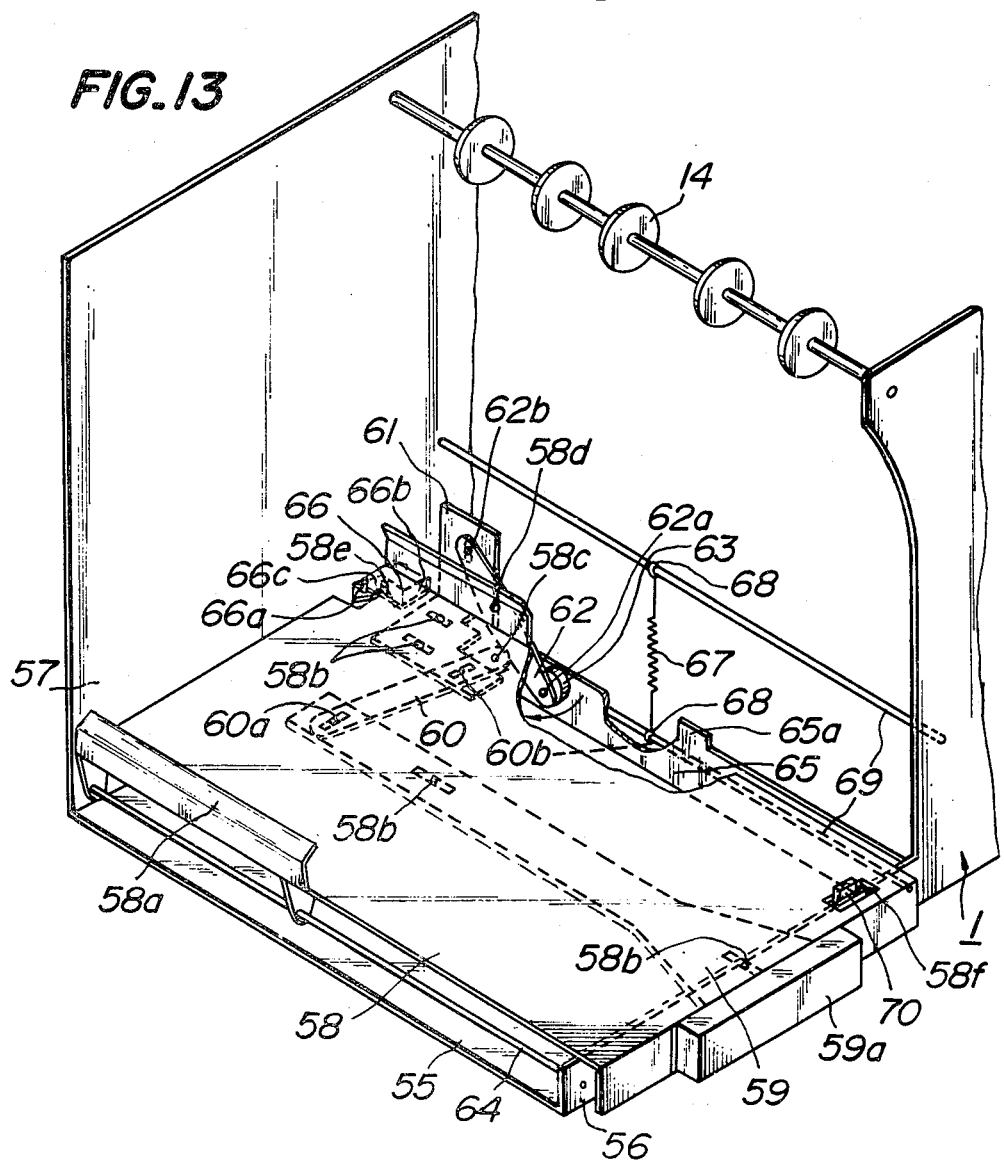
FIG. 13 is a perspective view of a mechanism for removably mounting a cassette in a copying machine according to another embodiment of the invention.

A mechanism for mounting and demounting cassette 2 in and from the copying machine body 1 may be alternatively constructed, as shown in FIG. 13.

FIG. 13 is a perspective view of the essential part of the roll sheet cassette, loading apparatus in the copying machine according to another embodiment of the invention.

Referring to FIG. 13, the copying machine body 1 has a bottom plate 55 and side plates 56 and 57 rigidly secured to the bottom plate 55. Shown at 58 in a cassette rest, at 59 an operating lever, at 60 an intermediate lever, at 61 a slide plate, at 62 a lifting lever, at 63 a roller, and at 58a a cassette holder. Operating lever 59 and slide plate 61 are slidably secured to cassette rest 58 by means of retaining pins 58b, respectively, and intermediate lever 60 and lifting lever 62 are rotatably supported by shafts 58c and 58d on cassette rest 58, respectively. Shown at 60a and 60b are respectively engaging pins for operating lever 59 and slide plate 61, both of which are rigidly secured to intermediate lever 60, and at 62a is a pin which is in engagement with slide plate 61. A rotary shaft 62a of roller 63 is secured to lifting lever 62. A shaft 64 and a rail 65 are rigidly secured to side plates 56 and 57. Cassette rest 58 is loosely fitted at one side on shaft 64, and roller 63 is in contact with rail 65, so that the cassette may be slidingly moved frontwards. A hook 66 is attached to cassette rest 58 by means of a shaft 58e and has one projection 66a engaging the cassette and one end 66b engageable with a projection 65a of rail 65. Shown at 67 is a spring, by which the cassette is biased downward, and at 68 a pair of slide pulleys which slide along a pair of upper and lower horizontal rods 69 extending between side plates 56 and 57. Designated 70 is a limit piece rigidly secured to side plate 56.

How to load and remove the cassette will be explained in reference to FIGS. 14A, 14B and 14C.

Figure 14A:
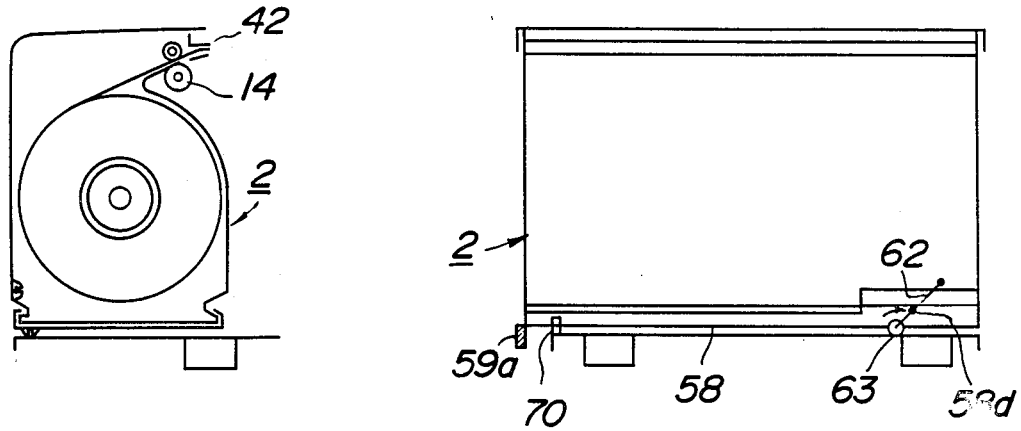
FIGS. 14A, 14B and 14C diagrammatically show the modes of the cassette mounting mechanism being operated for removal or loading of the cassette.
Figure 14B:
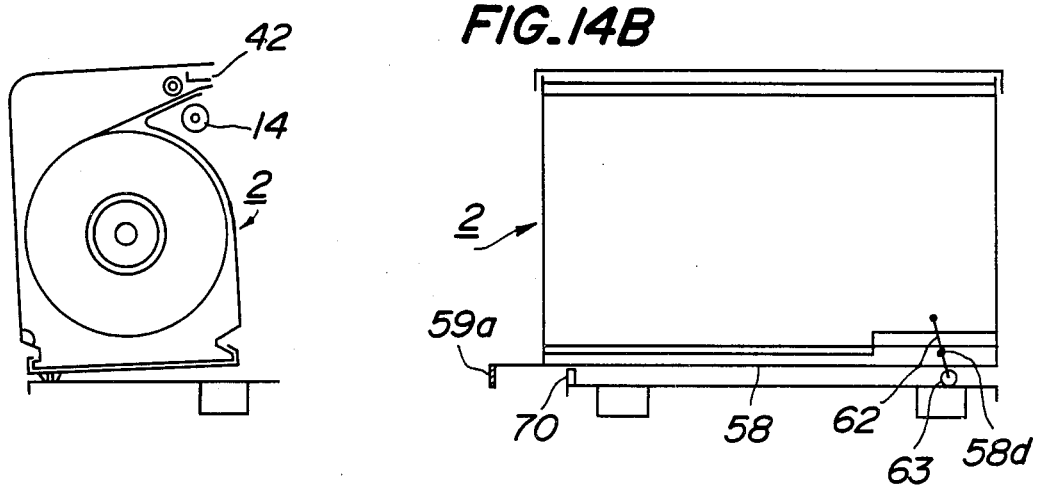
Figure 14C:
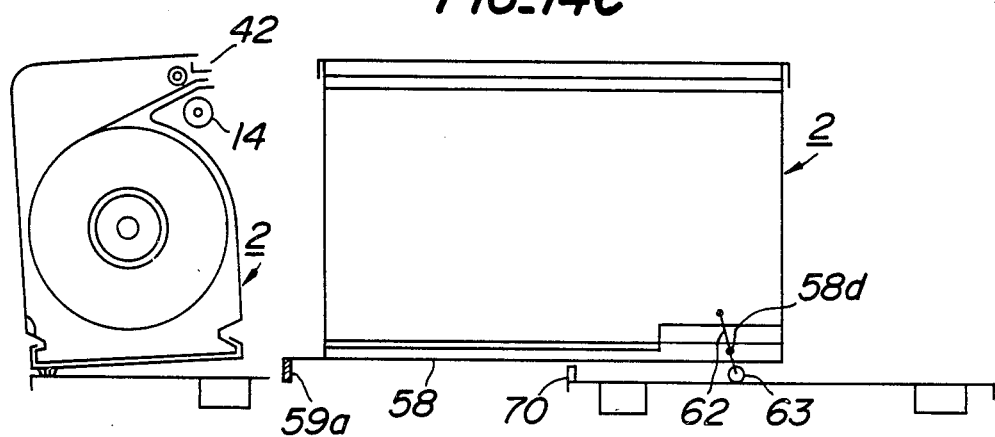

FIG. 14A shows the condition of the cassette loading apparatus, wherein cassette 2 is loaded. Respective parts on the copying machine side in FIG. 14A assume the position shown in FIG. 13; and in FIG. 14A cassette rest 58 assumes the first position. When it is desired to remove cassette 2 with the above conditions maintained intact, a grip 59a of operating lever 59 is pulled frontward as viewed in FIG. 13, so that operating lever 59 will be slidingly moved frontward since the lever 59 is slidably retained on cassette rest 58 by means of retaining pin 58a. Intermediate lever 60 will be turned about shaft 58c, and at the same time, slide plate 61 will be slid frontward, by virtue of engagement of pins 60a and 60b with slots in operating lever 59 and slide plate 61. Since the frontward movement of cassette rest 58 has been hindered by limit piece 70 at this time, then pin 62b engaging the slot in slide plate 61 will be forced to the frontward, to thereby rotate lifting lever 62 about shaft 58d, as a result of which roller 63 is rotated in a direction of arrow shown in FIG. 13. Lifting lever 62 is thus rotated beyond the dead center to the opposite side against the tensile strength of spring 67, so that the cassette rest will eventually assume a second position shown in FIG. 14B, in which beak portion 42 of cassette 2 is separated from sheet feed roller 14. Since, under this condition, an opening 58f in cassette rest 58 passes beyond limit piece 70, when operating lever 59 is further pulled, then cassette rest 58 will be slid along shaft 64 and rail 65 provided on each side of the cassette into a position shown in FIG. 14C. Since projection 66a of hook 66 is urged to the rear by cassette 2, the front end 66b of the hook remains out of contact with projection 65a of rail 65. As shown in FIG. 14C, beak portion 42 of cassette 2 has thus assumed the position spaced apart from sheet feed roller 14 in copying machine body 1, such that the cassette may be demounted with ease from the copying machine body 1 only by lifting the cassette. When cassette 2 is removed from copying machine body 1, hook 66 is rotated counterclockwise under the action of a return spring 66c into engagement with the right side face of projection 65a, whereas cassette rest 58 will no longer be shifted to the rear even in the event of operating lever 59 being forced to the rear. When a desired cassette is placed on cassette rest 58 and pushed backward, projection 66a of hook 66 will be pressed by the cassette, and hook 66 will be rotated clockwise, so as to be released from engagement with projection 65a, whereby the cassette may be slid backward. When the cassette is further forced to the rear, the cassette will impinge on side wall 57. At this time, limit piece 70 just meets opening 58f, and lifting lever 62 will be rotated in the reverse direction to that described above, under the force of spring 67 which acts on the lever 62 to bias downward, so that the cassette resumes the positions shown in FIGS. 14A and 13. The cassette 2 is thus loaded in place and the copying operation is allowed.

Also in this embodiment, a switch for making and breaking a sheet feed power source may be provided in the copying machine body 1 on the bottom side of cassette rest 58, so as to bring the sheet feed power source to the open and close positions in accordance with the completion of the mounting and demounting of cassette 2.

According to the present invention, the mounting and demounting of a cassette may be achieved with ease, while an operator assumes a posture of effecting a copying operation in front of the copying machine body, without a need to changing one's position to the left or right side of the copying machine body. Such arrangements save an office space to install the copying machine. Furthermore, simultaneously with the setting of a cassette in the machine body, the sheet feed roller in the machine body and the pinch roller in the cassette may hold a roll sheet therebetween, with the leading end of roll sheet positioned in coincidence with a given cutting line of a cutter, without resorting to any special means, thus providing the arrangements for a copying operation. Upon the loading of the cassette, the leading end of a roll sheet is moved from above with respect to the sheet feed roller, so that the leading end of sheet has no likelihood of being folded or damaged. The loading and removal of the cassette is therefore accomplished without resorting to a skilled hand.

The roll sheet cassette loading mechanism according to the present invention has solved various drawbacks as encountered with prior art devices, by the provision of means which is simple in construction and need not be so accurate in machining. The roll sheet cassette loading apparatus of the invention has overcome the drawbacks as experienced with a copying machine using a record sheet in the roll form, provides ease of handling and operates with high efficiency.

What has been described has no limitative sense, but it will be apparent for those skilled in the art that any changes and modifications may be made without departing the spirit of the invention and the scope of claims appended.

According to the present invention, after the pinch roller has been lifted by hand, the cassette may be pulled toward an operator. A pair of sheet feed rollers may be provided in the copying machine body, so that the cassette may be pulled toward an operator after the roll sheet has been released from the pair of sheet feed rollers. While in the embodiments shown, as members for guiding the feeding and transportation of the record sheet, there are incorporated the sheet feed roller 14 in the copying machine body and the pinch roller 38 in the cassette 2 both of which cooperate to hold a record sheet 40 therebetween, a belt, sliding guide or the like may be provided within the cassette instead of pinch roller 38. Opening 37 in sheet guide 36 may be a cut at the front edge of sheet guide 36, for providing the same function. While in the above embodiments, cassette casing 35 and sheet guide 36 are formed integrally, these cassette casing 35 and sheet guide 36 may be formed separately. In the latter case, the lower sheet guide 36 can be pressed on pinch roller 38, rather than pinch roller 38 is springbiased, so that a record sheet 40 may be held therebetween.

What is claimed is:

1. A cassette type roll sheet feeding apparatus for feeding a roll sheet from a cassette after the roll sheet cassette is removably loaded in a copying machine body, comprising: a sheet guide provided in said roll sheet cassette disposed near a sheet outlet and having at least one opening; means for assisting the feeding of said roll sheet; said means are provided in the cassette at such a position that it faces the opening formed in said sheet guide to assist the feeding of the roll sheet through the outlet, said means being urged against the sheet guide through the leading end of roll sheet; and a sheet feed roller provided in said copying machine body, said roller being adapted to project through said opening in the sheet guide, to hold a leading end portion of said sheet in cooperation with said means for assisting the feeding of the sheet from the outlet, when said cassette is mounted in the copying machine body; whereby, said sheet is held at the leading end portion thereof between said means for assisting the feeding of the sheet and said sheet guide, when said cassette is removed from the copying machine body.

2. An apparatus as claimed in claim 1, wherein: said means for assisting the feeding of roll sheet comprises a roller rotatably journaled by a shaft.

3. An apparatus as claimed in claim 2, wherein: spring means are provided for bringing the roller of the assisting means into pressure contact with the sheet guide, through the leading end of roll sheet.

* * * * *